(12) United States Patent
Levin et al.

(10) Patent No.: US 10,466,341 B1
(45) Date of Patent: Nov. 5, 2019

(54) INTEGRATIVE OPTICAL PLATFORM ASSEMBLY WITH AN OPTICAL DETECTION SYSTEM

(71) Applicant: Physical Optics Corporation, Torrance, CA (US)

(72) Inventors: Kenneth Levin, Huntington Beach, CA (US); Ranjit D. Pradhan, Torrance, CA (US); Kang Lee, Woodland Hills, CA (US); Andrew Kostrzewski, Garden Grove, CA (US); Tomasz Jannson, Torrance, CA (US); Samuel Nieva, Jr., Carson, CA (US); Shean Thomas McMahon, Seal Beach, CA (US)

(73) Assignee: PHYSICAL OPTICS CORPORATION, Torrance, CA (US)

( * ) Notice: Subject to any disclaimer, the term of this patent is extended or adjusted under 35 U.S.C. 154(b) by 407 days.

(21) Appl. No.: 15/339,738

(22) Filed: Oct. 31, 2016

Related U.S. Application Data

(60) Provisional application No. 62/249,040, filed on Oct. 30, 2015.

(51) Int. Cl.
| | |
|---|---|
| *G01C 3/08* | (2006.01) |
| *G01S 7/481* | (2006.01) |
| *G02B 7/182* | (2006.01) |
| *G02B 26/10* | (2006.01) |
| *G01S 17/02* | (2006.01) |
| *G01S 7/48* | (2006.01) |

(52) U.S. Cl.
CPC .......... *G01S 7/4817* (2013.01); *G01S 7/4808* (2013.01); *G01S 7/4814* (2013.01); *G01S 17/026* (2013.01); *G02B 7/1821* (2013.01); *G02B 26/105* (2013.01)

(58) Field of Classification Search
CPC .... G01S 7/4817; G01S 7/4814; G01S 7/4808; G01S 17/026; G02B 7/1821; G02B 26/105
USPC ....................................... 356/4.01
See application file for complete search history.

(56) References Cited

U.S. PATENT DOCUMENTS

| | | | | |
|---|---|---|---|---|
| 4,830,489 A * | 5/1989 | Cain | ................... | G01C 15/004 356/141.1 |
| 6,493,067 B1 * | 12/2002 | Kodaira | .............. | G01C 15/004 356/141.1 |
| 6,782,015 B1 * | 8/2004 | Kawatani | ............. | G01C 15/004 372/24 |
| 6,879,419 B2 * | 4/2005 | Richman | ................ | G02B 13/06 359/203.1 |
| 2006/0283317 A1 * | 12/2006 | Melnychuk | ........... | G01S 17/023 89/41.03 |
| 2010/0002222 A1 * | 1/2010 | Lubard | ................. | G01S 7/4802 356/4.01 |

(Continued)

*Primary Examiner* — Mark Hellner
(74) *Attorney, Agent, or Firm* — Sheppard, Mullin, Richter & Hampton LLP

(57) ABSTRACT

An optical platform assembly may include a head with a scan mirror; a body with an optical module to detect a hard body object; and a rotary connector that attaches the head to the body of the optical platform assembly. In some instances, the rotary connector may allow the head to rotate about the body, where the body is mounted and stationary to the surface. The optical body may be configured to detect for specific hard body objects, such as periscopes.

18 Claims, 13 Drawing Sheets

(56) References Cited

U.S. PATENT DOCUMENTS

2016/0047899 A1\* 2/2016 Dussan .................. G01S 7/484
356/4.01

\* cited by examiner

US 10,466,341 B1

INTEGRATIVE OPTICAL PLATFORM ASSEMBLY WITH AN OPTICAL DETECTION SYSTEM

CROSS-REFERENCE TO RELATED APPLICATIONS

This application claims the benefit of an priority to U.S. Provisional Patent Application Ser. No. 62/249,040 filed on Oct. 30, 2015, the content of which is incorporated herein by reference its entirety.

TECHNICAL FIELD

The disclosed technology relates generally to optical detection systems. More specifically, embodiments of the disclosed technology relate to the assembly of an optical platform that relate to systems and methods for long distance optical detection.

BACKGROUND

Optical detection systems are provided for detecting objects in the presence of clutter and discriminating between target objects and clutter. However, there is a need to enable better discrimination between clutter and target objects with lower false alarm rates.

Additionally, whether the optical detection systems are active (laser-based) or passive (sensor-based), the optical detection systems typically are supported and mounted onto a motor-driven gimbal platform to counter any motion, thereby improving the stability and pointing aim of optical detection systems. This is especially true when the optical detection systems are to be placed on a platform or surface that is unsteady, such as a ship or a plane. However, current motor-driven gimbal platforms are often large and bulky, and this severely limits the placement of the optical detection system in areas that would provide a better area for detecting objects, such as on a ship mast.

Additionally, because the entire optics module is often required to move along with the motor-driven gimbal system, this results in high frequency pointing errors due to bulkiness and large size. For example, the bulky nature of current motor-driven gimbals impedes the ability to point to the desired areas rapidly when attempting to transmit and receive optical return signals. This often results in differential flexure and poor data.

BRIEF SUMMARY OF EMBODIMENTS

According to various embodiments of the disclosed technology, assemblies and methods are included to detect and distinguish between targets, such as hard-body objects and clutter. The optical platform assembly may be configured to be a compact and an integrated structure so as to compensate for rugged environments and moving platforms.

In some embodiments, the optical platform assembly includes a head with a scan mirror; a body with an optical module to detect a hard body object; and a rotary connector that allows the head to securely attach to the body of the optical platform assembly. In some instances, the rotary connector is configured to allow the head to rotate about the body, where the body is stationary and mounted to a surface.

Also included are methods for detecting a target object, which may include activating a laser housed within a lower non-rotating assembly of an optical platform assembly; scanning an environment by emitting a laser to a mirror housed within an upper rotating assembly; retrieving an emitted laser beam that is reflected from the target object, where the emitted laser beam is collinear with a retrieved laser beam; processing a data from the retrieved laser beam to detect for the target object; and transferring data to a retroscan when the hard body surface is discovered from the data, where the retroscan detects for a specific target object from the data transferred.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description is not to be taken in a limiting sense, but is made merely for the purpose of describing the general principles of the disclosed embodiments. The present embodiments address the problems described in the background while also addressing other additional problems as will be seen from the following detailed description. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

According to various embodiments of the disclosed technology, an optical platform assembly for housing an optical detection system is included. The optical platform assembly may be configured to be a light, compact and integrated structure, which enables mounting the optical platform assembly onto various strategic areas, such as a ship mast. This cannot be done with current optical platform assemblies because they are often too large to be supported or mounted onto a ship mast.

In some embodiments, the optical platform assembly may have an upper rotating assembly and a lower non-rotating assembly. The upper rotating assembly may include a scan mirror that is designed to aim and scan a laser beam in azimuth with adjustments in elevation and simultaneously collect a return optical signal co-linear with the emitted laser beam. In some instances, the lower rotating assembly houses an optical module assembly that includes modular and interchangeable optical components, such as an eye-safe laser, telescope, and sensor. The optical module assembly may include an electronic and processing system and hardware so as to perform and calculate the data provided by the lasers and sensors.

In some embodiments, the scan mirror and the optical module assembly in combination results in an optical detection system. The optical detection system may be configured to detect objects and discriminate such objects as target objects and clutter. In some embodiments, the optical detection system includes an eye-safe pulsed laser and sensor array used in a scanned LIDAR configuration. By way example, such target objects may include the detection of hard body marine objects and submarine periscopes from a ship at sea.

Figure 1:
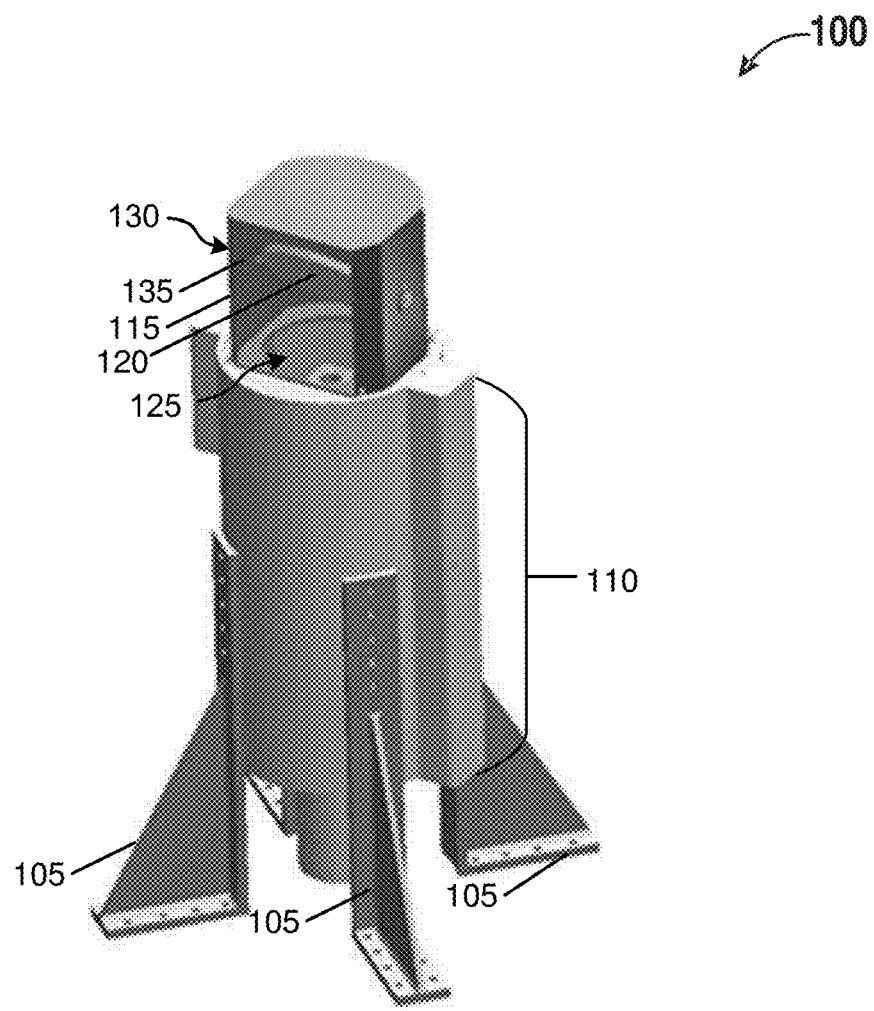
FIG. 1 illustrates an optical platform assembly according to one particular embodiment.

FIG. 1 illustrates an optical platform assembly 100 according to one particular example embodiment. As illustrated, the optical platform assembly 100 may include a body 110 that is stationary and rigidly mounted to a surface via one or more secure mounts 105. A plurality of secure mounts 105 may be fastened at the base of the optical platform assembly 100 to securely anchor it onto a surface, such as the surface of a ship or an aircraft by way of example only. In some instances, the secure mounts 105 may include pneumatic vibration isolation to aid in absorbing and damping vibrations that may otherwise be transferred from the platform to the optical platform assembly 100. Both active vibration isolation and passive vibration isolation may be utilized to prevent the transfer of such vibrations to the optical platform assembly 100.

The body 110 may include a hollow interior 125. While this exemplary body 110 has a cylindrically shaped enclosure, the body 110 may include various shapes and sizes as appreciated by any person of ordinary skill in the art upon reading this disclosure. With respect to size, the body 110 must be of adequate size to at least house the necessary modular and interchangeable components of optical systems, such as a laser, telescope, sensor, and optics. All the modular and interchangeable components of the optical systems may all be neatly compacted and in close proximity with one another and mounted to be in a vertical position within the cylindrical enclosure of the body 110. This is so that the body 110 may be small, light and compact in size. In some embodiments, the geometry is such that it may even be mounted on a ship mast or other like enclosures.

At the top end of the body 110, a head 115 is attached. In some instances, the head 115 rotates about the body 110. As such, in this and similar examples, the head 115 may be considered to be the upper rotating assembly, while the stationary body 110 is considered to be the lower non-rotating assembly. The head 115 may be coupled to the top end of the body 110 via rotatory connector (examples of which are shown in FIGS. 5-8, below), which allows the head to rotate about the stationary body 110. In some instances, the head 115 may be configured to achieve a full 360 degree rotation about the axis of the body 110. Because the body 110 is stationary with only the head 115 capable of movement, this allows for movement to be concentrated to a small portion of the optical platform assembly 100, allowing for swifter movement, more rapid changes in movement, and higher pointing accuracy. More information with respect to the rotary connector is provided in greater detail below.

Because movement of the optical platform assembly 100 is limited to a small portion, such as the head 115, this configuration effectively minimizes or eliminates the need to impose size restrictions to the modular and interchangeable components of optical systems located within the body 110. Therefore, the disclosed optical platform assembly 100 can provide greater sensitivity and range by using larger diameter receiver optics and more powerful and larger lasers than what may be typically used, since only the relatively lightweight head is moving to transmit and receive optical signals. But smaller optical systems may also be used as well, which allows the optical platform assembly 100 to then be placed in areas of small space, such as on top of a ship mast. Thus, depending on where the optical platform assembly is to be mounted, various sizes and shapes of the body 110 and the head 115 may be configured to meet the spacing needs and restrictions.

In some embodiments, the head 115 of the upper rotating assembly may also include a scan mirror 120. In some embodiments, the scan mirror 120 may be an elliptical scan mirror with a broadband high reflectivity coating in the visible or near infrared range. In some instances, the scan mirror 120 may also have a low scatter polish and be constructed using a honeycomb construction so that the scan mirror 120 is lightweight.

In some embodiments, the rotating head 115 of the upper rotating assembly may include an opening 130 so that a transmitted laser beam sourced from a laser within the body 110 of the lower non-rotating assembly may be directed by the scan mirror 120 and exit the optical platform assembly 100. To protect the scan mirror 120 and any modular components located within the hollow body 110, a window 135 may be placed to cover the opening 130. By way of example only, the window 135 may be composed of near-IR transmitting materials. Additionally, the window 135 may also be composed of materials that may include low hydrogen oxide fused silica, quarts or sapphire, and coated with a hard coating to protect against laser pitting and environmental damage.

In some instances, the rotating head 115 may also include a heater to prevent or reduce the accumulation and presence of dew and condensation on the window 135. Additionally, the exterior edges along the window 135 may be lined with an air flow curtain to reduce or prevent the accumulation of the salt spray from forming on the windows 135.

Figure 2:
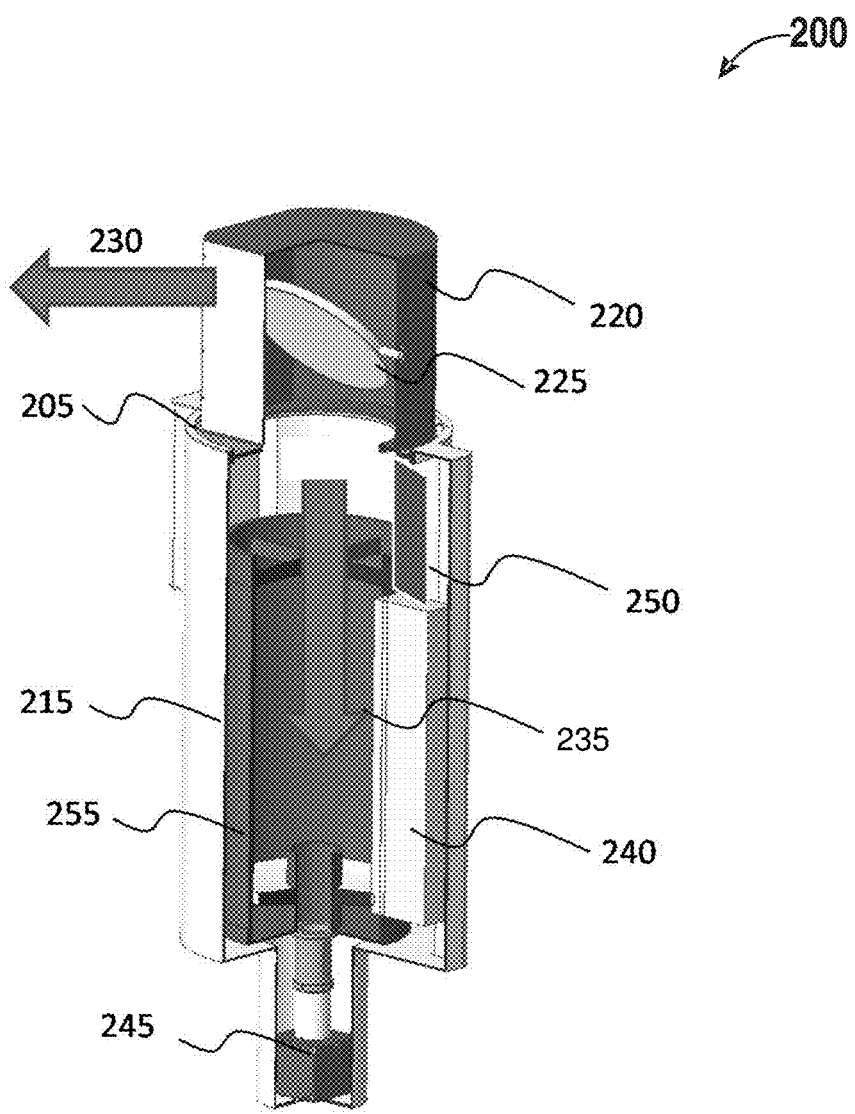
FIG. 2 illustrates a cross-sectional view of an optical platform assembly according to one particular embodiment.

FIG. 2 illustrates a cross-sectional view of an optical platform assembly 200, as indicated and described above with respect to FIG. 1. FIG. 2 more clearly shows that the body 205 is hollow, which allows for modular components to be stably positioned within a body 205 that is stationary. The modular components may include, for example, an eye-safe laser 240, sensor 245, telescope 255 and laser beam expander 250, which may be collectively referred to herein as the optical module assembly.

Additionally, the exterior of the body 205 may include a mounting enclosure assembly 215. The mounting enclosure assembly 215 may be a sealed and compact mounting that allows the optical module assembly to be placed in close proximity to one another while being securely stored in an enclosed environment. By way of example, the mounting enclosure assembly 215 may compensate for the vibrations or movement of the surface on which the optical platform assembly in mounted on, such as the surface of a ship or plane. Additionally, the mounting enclosure assembly 215 may also compensate for any environmental conditions that may cause the optical platform assembly 200 to move or vibrate, such as strong winds or extreme vibrations from an engine.

Additionally, the optical platform assembly 200 also includes a rotating head 220, otherwise known as the upper rotating assembly. In some instances, the rotating head 220 may include a scan mirror 225. Here, arrows 230, 235 are provided to show the direction of a transmitted laser beam and the direction of the received laser beam respectively. Because the eye-safe laser is collimated with the aid of a scan mirror that acts as a beam splitter, the laser is able to emit laser beams that are collinear with the received laser beams. Here, the placement of the scan mirror 225 is located above body 205 that houses the optical module assembly.

The optical module assembly may include a telescope 255, eye-safe laser 240, sensor 245 and laser beam expander 250. By way of example, the eye-safe laser 240 may be a pulsed laser that has a 10 nanosecond pulse width. Additionally, the telescope 255 may have a dovetail plate for rigidly mounting the eye-safe laser 240 head to the laser beam expander 250. As depicted, the laser beam expander is co-located with the eye-safe laser 240 and the receiving end of the telescope 255. Unlike other optical systems, which typically do not include any laser beam expanders or else locates the laser beam expander in a separately mounted optical bench, this disclosed configuration allows for a more powerful pulsed laser without damaging any of the mirror coatings. Additionally, this configuration allows for a compact assembly while avoiding any complex mounting or positioning equipment.

Figure 3:
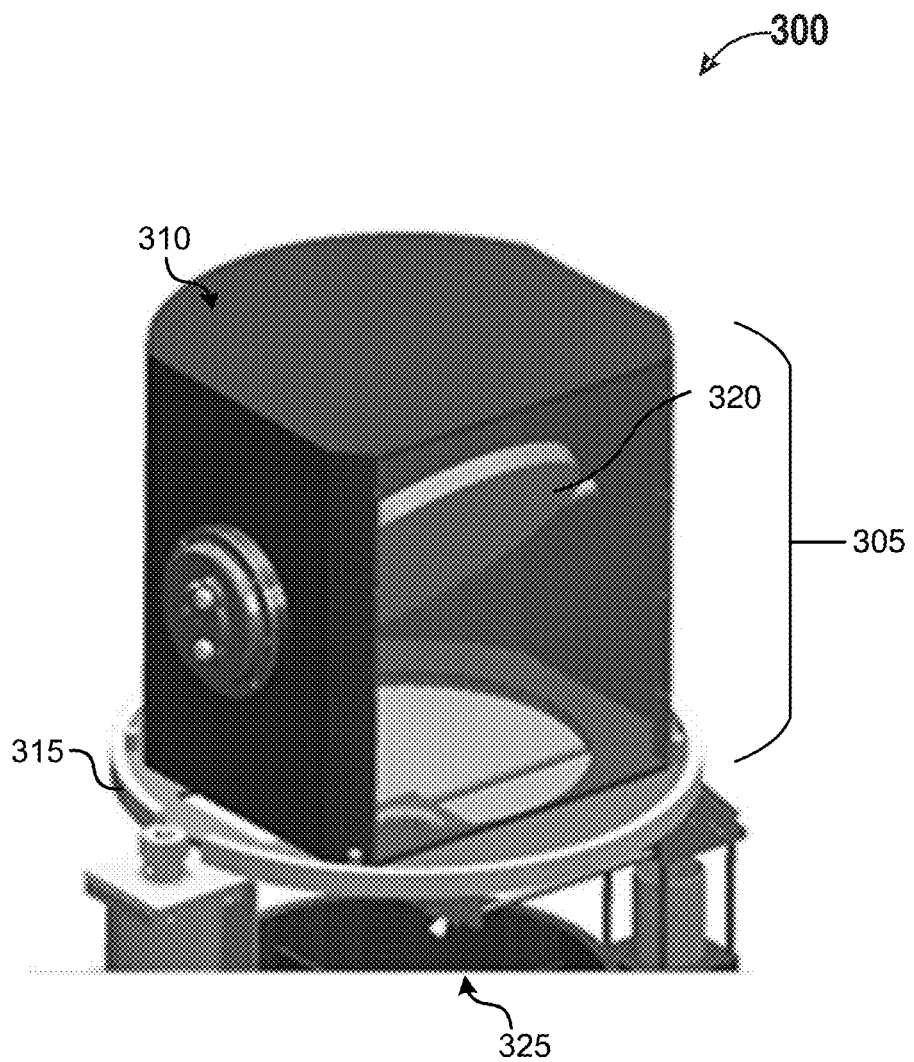
FIG. 3 illustrates a rotating head piece of an optical platform assembly positioned onto a rotary connector according to one particular embodiment.

FIG. 3 illustrates the upper rotating assembly 305 of an optical platform assembly 300 according to one particular embodiment. Here, as illustrated, upper rotating assembly 305 includes a rotating headpiece 310. In some embodiments, the rotating headpiece 310 is able to rotate about the vertical axis of the optical platform assembly 300. In some instances, the rotating headpiece 310 is able to rotate a full 360 degrees so that a complete 360 degree scan of the environment can be achieved.

In some embodiments, the rotating headpiece 305 is able to achieve such a motion by rotating along the tracks of the rotary connectors 315. This may allow only for the rotating headpiece 310 to move while the body 325 of the optical platform assembly 300 is stationary. As a result, high speed scanning of collinear laser beams can be achieved with the transmitted and received optical beams with the aid of the scan mirror 320. More information with regard to example rotary connectors 310 is presented below.

Figure 4:
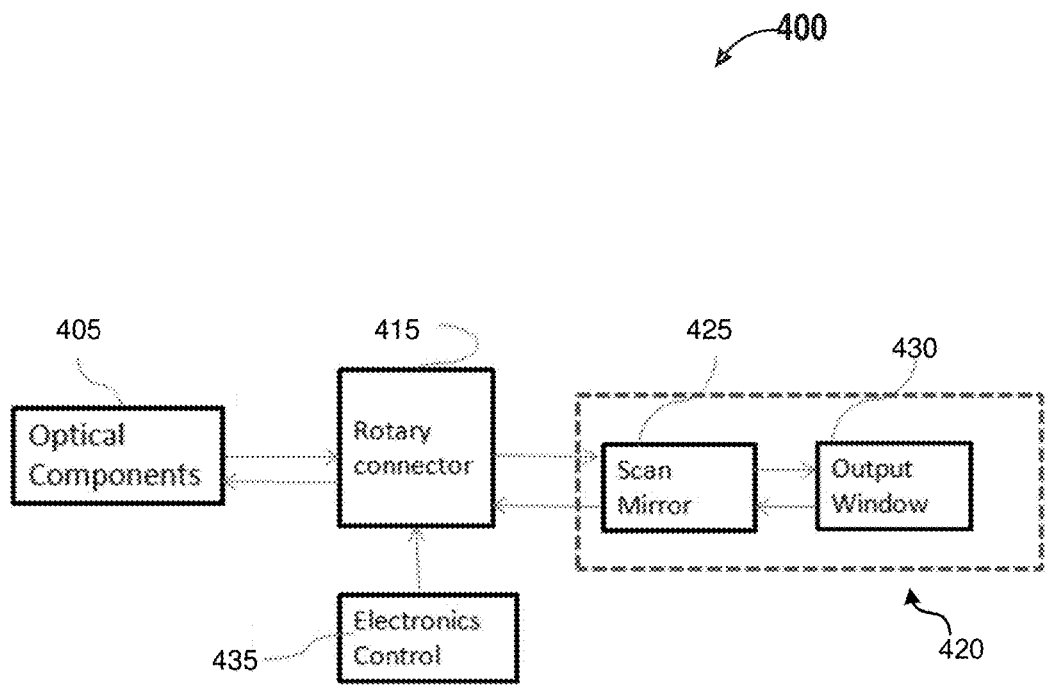
FIG. 4 illustrates an optical platform assembly with a rotary connector according to one particular embodiment.

FIG. 4 illustrates an optical platform assembly 400 according to one particular embodiment. This exemplary optical platform assembly 400 is a generic example. As depicted, the optical platform assembly 400 may include an optical module assembly 405 and a scanner assembly 420 that are physically separated by a rotary connector 415. In this example, not only are optical module assembly 405 and the scanner assembly 420 separated physically, but the optical module assembly 405 may the stationary section while the scanner assembly 420 is able to rotate about the axis of the optical module assembly 405.

Additionally, the optical module assembly 405 may contain modular and interchangeable optical components, such as a laser, telescope, sensor, and optics. The transmitted laser beam may be collimated and expanded, which then passes through the rotary connector 415 and hits the scan mirror in the scanner assembly 420. The scan mirror 425 is able to direct the laser out of the scanner assembly 420 so that the laser is now transmitted over the air and towards a potential target. Once the laser beam hits a target, the return signal follows the exact path of the transmitted signal and is co-linear with the emitted laser beam. The laser signal then passes again through the window 430 of the scanner assembly 420 and hits the scan mirror 425 to return to the optical module assembly 405. In some instances, the optical module assembly 405 includes telescope. The return laser signal may be focused by the telescope and focused onto the sensor by the conditioning optics.

With respect to moving the scanner assembly 420 about the optical module assembly 405, a rotary connector 415 may be utilized. The rotary connector 415 may include a rotary joint (not shown here) connected to a motor so as to provide the necessary electromechanical component to allow the scanner assembly to achieve a complete 360° rotation about the optical module assembly 405. Here, the rotary connector 415 may be connected to an electronics control 435, which may provide the necessary electrical components and connections to cause the scanner assembly 420 to rotate about the optical module assembly 405.

Figure 5:
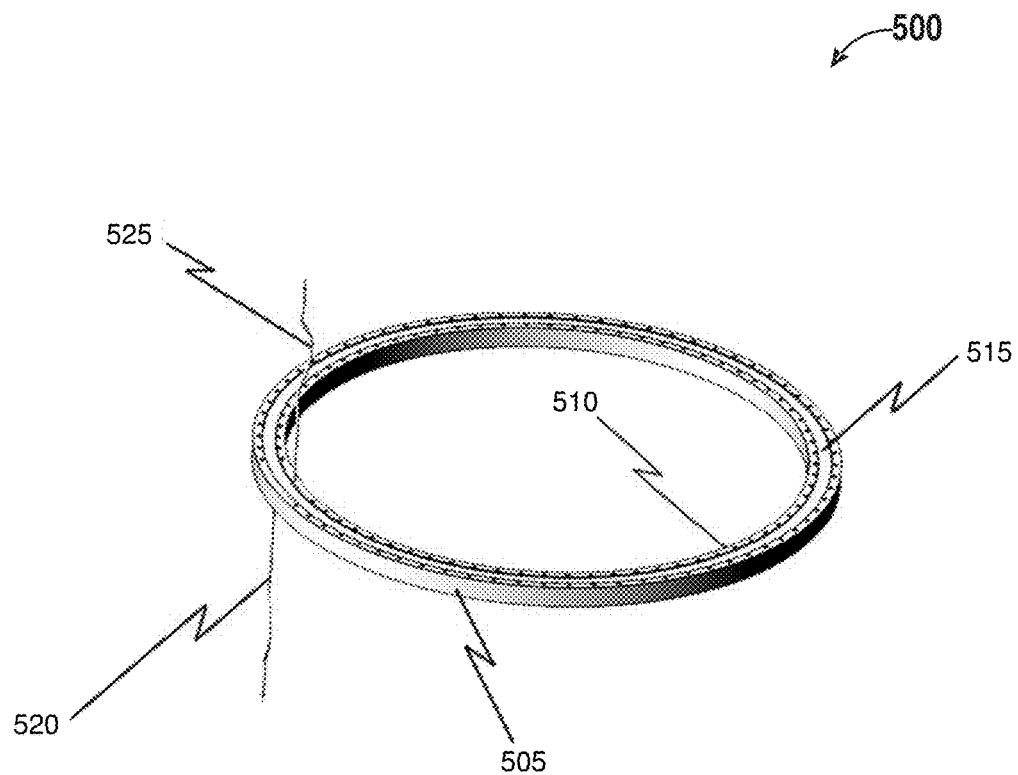
FIG. 5 illustrates a single rotary joint of a rotary connector with electrical wires according to one particular embodiment.

FIG. 5 illustrates a rotary joint 500 with electrical wires, or leads, 520, 525 according to one example embodiment. An individual rotary joint 500 may include an outer stator ring 505, where the outer stator ring 505 is stationary, and may be assembled as a part of the motor. Additionally, the individual rotary joint 500 may also include an inner rotor ring 510 that rotates relative to outer stator ring 505. Although not illustrated in FIG. 5, electrical contacts may be provided to electrically connect outer stator ring 505 and the inner rotor ring 510, while still allowing these rings to rotate relative to one another. An example of this is disclosed below with reference to FIG. 7.

Additionally, both the outer stator ring 505 and the inner rotor ring 510 may include electrical contacts to which electrically conductive leads 520, 525 may be connected, respectively. The electrically conductive leads 520, 525 provide for current flow into and out of the outer stator ring 505 and the inner rotor ring 510. Furthermore, in between the outer stator ring 505 and the inner rotor ring 510, a seal ring 515 may be placed in between to provide spacing so as to help provide low friction and wear.

Figures 6A, 6B:
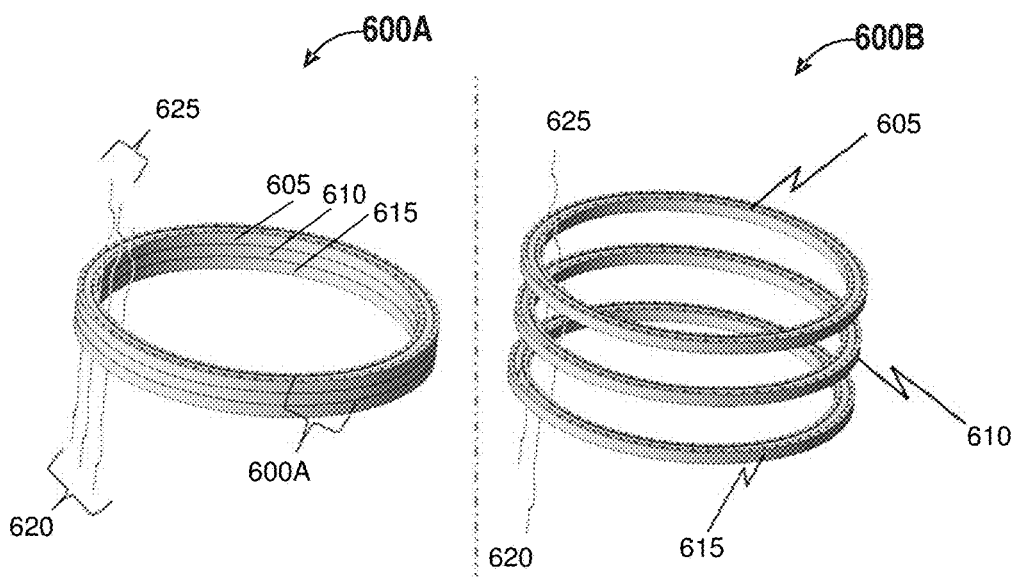
FIG. 6A illustrates a rotary joint unit of a rotary connector with electrical wires according to one particular embodiment.
FIG. 6B illustrates an exploded view of a rotary joint unit of a rotary connector according to one particular embodiment.

FIG. 6A illustrates the stacking of multiple individual rotary joints 605, 610, 615 to create a single rotary joint unit 600A with electrical wires 620, 625 according to one particular embodiment. As illustrated, a first individual rotary joint 605 is placed on top of a second rotary joint 610, in which the second rotary joint 610 is placed on top of a third rotary joint 615. While this exemplary single rotary joint unit 600A shows the stacking of three individual rotary joints 605, 610, 615, it should be noted that this modular construction allows for unlimited stacking arrangements. As such, all the inner rotor rings (not shown here) can be configured to rotate synchronously with each other. With the stacking, there may be the presence of very small spacing in between each of the individual rotary joints 605, 610, 615 in order to avoid unnecessary friction during the rotary motion.

FIG. 6B illustrates the exploded view of the stacking of multiple individual rotary joints 605, 610, 615 of the single rotary unit 600B with electrical wires 620, 625 according to one particular embodiment. Here, the illustration more clearly shows the stacking of the individual rotary joints 605, 610, 615 on top of one another. Additionally, FIG. 6B also depicts multiple independent electrical transmission paths with the electrical wires 620, 625 placed through the inner rotor rings and the outer stator rings of each of the individual rotary joints 605, 610, 615.

Figures 7A, 7B:
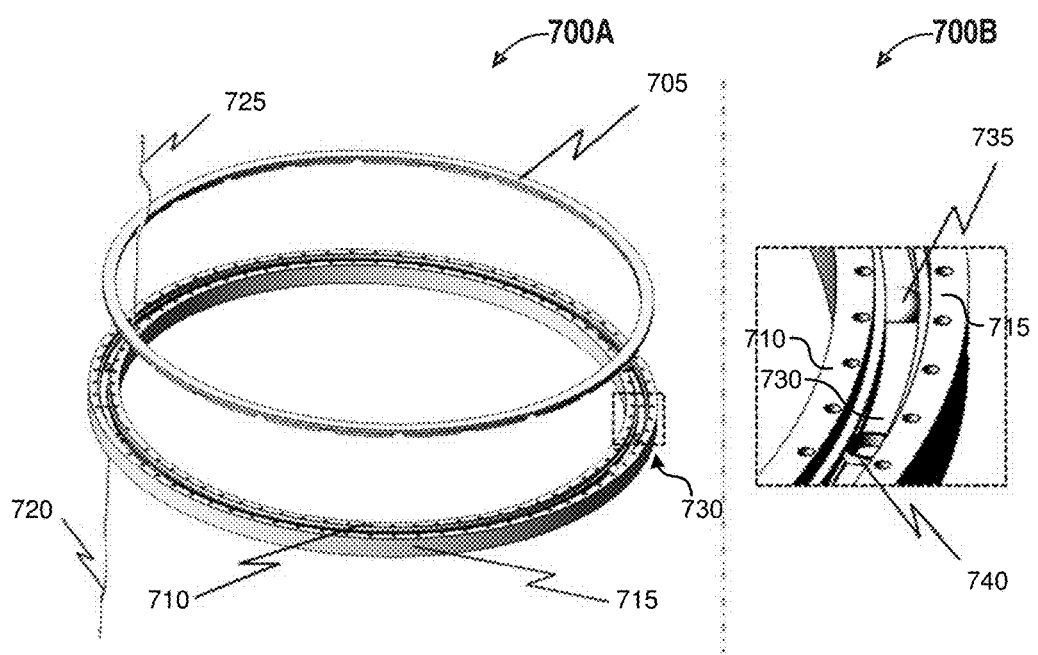
FIG. 7A illustrates an exploded view of a single rotary joint according to one particular embodiment.
FIG. 7B illustrates a close view of a bearing track of a single rotary joint according to one particular embodiment.

FIG. 7A illustrates an example of an individual rotary joint 700A with electrical wires 720, 725 according to one particular embodiment. The individual rotary joint 700A includes an inner rotor ring 710 and an outer stator ring 715 (e.g., outer stator ring 505 and inner rotor ring 510). In this example, a bearing track 730 is disposed between rings 710, 715. Bearing track 730 provides electrical connectivity between inner rotor ring 710 and an outer stator ring 715. The bearing track 730 is also shown in enlarged area depicted at FIG. 7B. As such, FIGS. 7A and 7B are explained herein together.

FIG. 7B illustrates an exploded view of a bearing track 730 of a rotary joint 700B according to one particular embodiment. In this example, the inner rotor ring 710 and the outer stator ring 715 each include extensions that form a bearing track 730 between these two rings 710, 715. The bearing track 730 in this example is located between the inner rotor ring 710 and the outer stator ring 715. Within bearing track 730 is positioned a ball bearing 735 to provide mechanical support and a contact ring 740 to provide electrical conductivity and continuity between the inner rotor ring 710 and the outer stator ring 715.

Although one ball bearing 735 is illustrated in FIG. 7B, several ball bearings may be spaced about the entire bearing track 730 to maintain spacing about the entire circumference. The ball bearings 735 keep rings 705, 715 at a relatively constant spacing, while allowing them to rotate with respect to one another. Likewise, although one contact ring 740 is illustrated in FIG. 7B, several contact rings 740 may be disposed about the circumference of the ring connector. In some embodiments, there is one contact ring 740 between every pair of all bearings 735. In this arrangement, several ball bearings 735 and contact rings 740 are positioned in an alternating fashion about the circumference of the connector.

The contact rings 740 in some embodiments may be configured as cylindrical rings that are sized to fit within the edges of bearing track 730. Contact ring 740 are made of a conductive material such as, for example, copper, silver, gold, or other conductive materials. Contact rings 740 may be configured to have a slightly larger diameter in size than the ball bearings 735. As such, when outer and inner rings 710, 715 are positioned coaxially with the spacing governed by ball bearings 735, contact rings 740 are slightly compressed. This compression can lead to the contact rings 740 taking on more of an ovate or elliptical shape. This compression provides a firm mechanical contact between inner and outer rings 710, 715 and contact rings 740. This compression also provides a greater contact area between contact rings 740 and inner and outer rings 710, 715. In some embodiments, the ball bearing 735 may also be compressible so as to conform to the inner rotor ring 710 and the outer stator ring 715.

The contract rings 740 located throughout the perimeter provide for both power and data transmission through the rotary joint 700A in a manner that allows for continuous continuity of electrical current with low distortion. Also, the contact rings 740, like ball bearings 735, may be designed to roll rather than slide, which results in low micro and macro-fretting. This then significantly lessens the production of any foreign-object-debris during operation. Also, because traditional rotary joints with brush contacts are not required or utilized here, this allows for a greater mean time before motor failure.

Referring back to FIG. 7A, a seal ring 705 is also present. The seal ring 705 may be used to provide protection from the environment for both the ball bearings 735 and the contact rings 740, as well as provide spacing between them. For example, the notches shown in the underside of the seal ring 705, are provided in an equally spaced relation about the circumference of the seal ring 705. These notches can be used to maintain spacing between ball bearings 735 as the inner and outer rings 710, 715 rotate relative to one another. As illustrated, the seal ring 705 contains equally spaced out grooves or cutouts to accommodate the presence of the ball bearing 735 and to keep them spaced out from one another. Additionally, the seal ring 705 may also provide spacing in between the stacks of each of the rotary joints when the rotary joints are stacked on top of one another. This alleviates any friction between the rotary joints 700A, 700B. Although only one seal ring 705 is illustrated, in some embodiments, top and bottom seal rings 705A, 705B, may be provided.

Figures 8A, 8B:
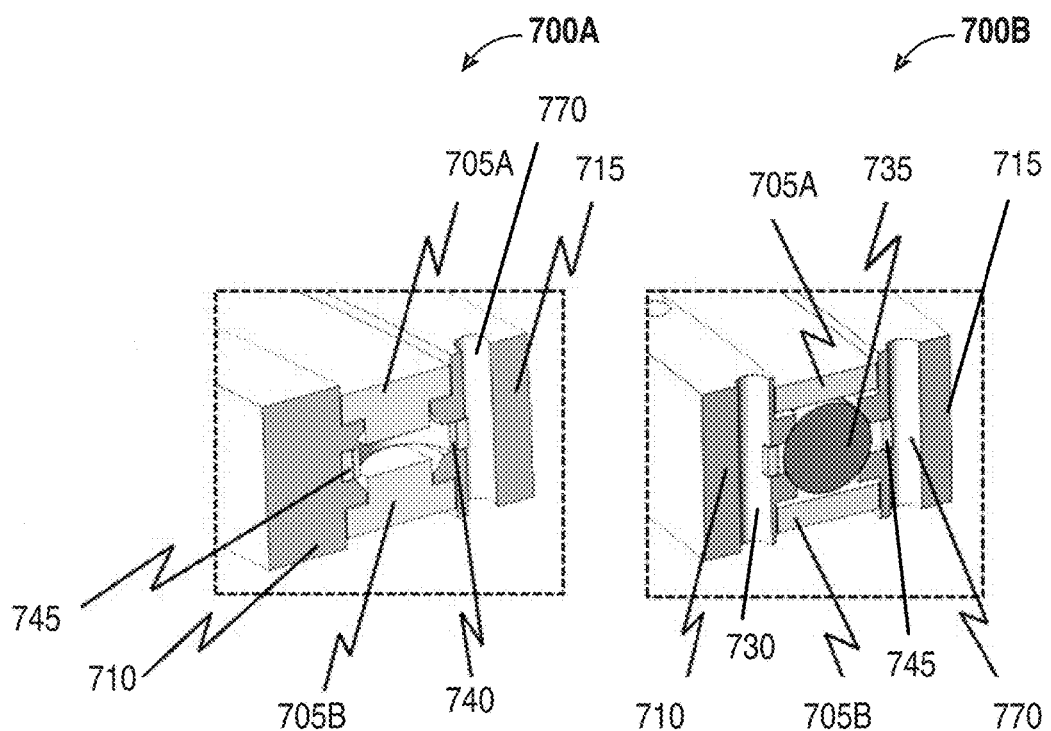
FIG. 8A illustrates a cross-sectional view of a single rotary joint of a contact ring section according to one particular embodiment.
FIG. 8B illustrates a cross-sectional view of a single rotary joint of a ball bearing section according to one particular embodiment.

FIG. 8A illustrates a cutaway view of an individual rotary joint 700A according to the example illustrated above with respect to FIGS. 7A and 7B. FIG. 8B illustrates a cutaway view of a ball bearing 735 section of an individual rotary joint 700B according to one the example illustrated above with respect to FIGS. 7A and 7B. As such, both FIGS. 8A and 8B will be explained herein together. As illustrated, FIG. 8A shows a cross-sectional view of an individual rotary joint 700A taken at a contact ring 740 section. FIG. 8B shows a cross-sectional view of an individual rotary joint 700B taken at a ball bearing 735 section.

As seen at FIG. 8A, the contact ring 740 is located within the bearing track formed by the outer stator ring 715 and the inner rotor ring 710. Also included are two electrical contacts 745, one for each of the outer stator ring 715 and the inner rotor ring 710. Each of these two electrical contacts 745 may run around the entire circumference of the outer stator ring 715 and the inner rotor ring 710. In various embodiments, the outer stator ring 715 and the inner rotor ring 710 are nonconductive (e.g., made from dielectric or insulating materials) so as to not conduct electricity or electrical signals. Electrical contacts 745 can be disposed within the slot created between the inner protruding ridges on outer stator ring 715 and the outer protruding ridges on inner rotor ring 710. An example of this is shown in FIGS. 8A and 8B.

The contact ring 740 is positioned within bearing track 730 and in an orientation and configuration so as to be in contact with electrical contacts 745 on each side of the bearing track 730. The contact ring 740 may provide for electrical conductivity and continuity between the electrical contacts 745 of each of the outer stator ring 715 and the inner rotor ring 710. When the outer stator ring 715 and the inner rotor ring 710 are rotated relative to one another, the contact ring 740 rotates within the track, allowing rotation of the inner and outer rings 710, 715 with a relatively small amount of friction, while maintaining intellectual connectivity with contacts 745 during rotation.

Disposed on top and beneath the bearing track is a top seal ring 705A and a bottom seal ring 705B, respectively. The top seal ring 705A and the bottom seal ring 705B not only allow for space between the contact ring 740 and a ball bearing 735, but also allows for space between the outer stator ring 715 and the inner rotor ring 710, so that the two are maintained in a spaced-apart relation.

Also, the outer stator ring 715 in FIG. 8A includes an electrical connection path 770, within which an electrical wire or other electrical connection (not illustrated) may be placed. As illustrated, electrical connection path 770 forms a channel or via through which an electrical connector such as, for example, an insulated wire can be run. The conducting portion of the wire can be soldered or otherwise electrically connected to electrical contacts 745 of the outer stator ring 715. As illustrated in FIG. 8B, both the outer stator ring 715 and the inner rotor ring 710 may include an electrical connection path 770. In the case of inner rotor ring 710 a wire can be run through its electrical connection path 770 and be soldered or otherwise electrically connected to the electrical contact 745 of inner rotor ring 710.

As seen at FIG. 8B, the ball bearing 735 may be placed in between the outer stator ring 715 and the inner rotor ring 710 to provide mechanical support and spacing between the two. As one of ordinary skill in the art will appreciate after reading this description, an electrical wire can be positioned to run from the component on which outer rotor ring 715 is mounted (e.g., body 205 in the example of FIG. 2) to electrical contact 745 of outer rotor ring 715. Because outer rotor ring 715 is fixedly mounted on this body portion (e.g., body 205) the wire does not rotate, and the problem of "cable wrap" often associated with prior art rotary connections can be avoided. Similarly, another electrical wire can be configured to run from the component on which inner stator ring 710 is mounted (e.g., rotating head 220 in the example of FIG. 2). And, because inner stator ring 710 is fixedly mounted on this body portion (e.g., rotating head 220) this wire does not need to rotate relative to the connector. Where multiple rings are stacked as in the example of FIG. 6, wires for training of the stack, can be run through the stack to their appropriate rotary connector.

Figure 9:
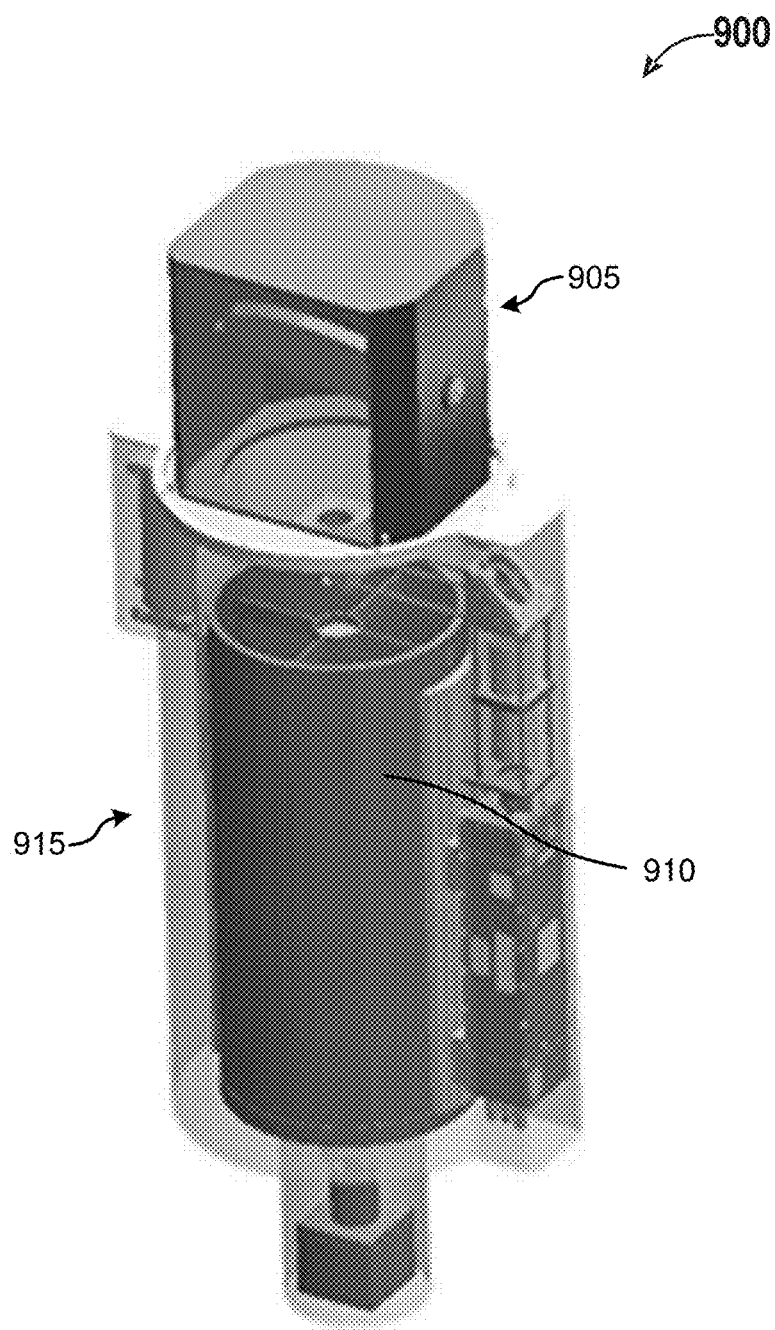
FIG. 9 illustrates an optical platform assembly for detecting a periscope according to one particular embodiment.

FIG. 9 illustrates an optical platform assembly 900 according to one particular embodiment. As described above, the optical platform assembly 900 may include an optical modular assembly 910 as described above, which may be located in the hollow cylindrical area, or body 915 of the optical platform assembly 900. In some instances, the optical modular assembly 910 may be configured to detect objects in the presence of clutter and discriminate between target objects and clutter. In some embodiments, the optical modular assembly 910 in conjunction with the scanner module 905 may be configured to detect particular targets, such as hard body targets and periscopes in the ocean, which is described in detail below.

Figure 10:
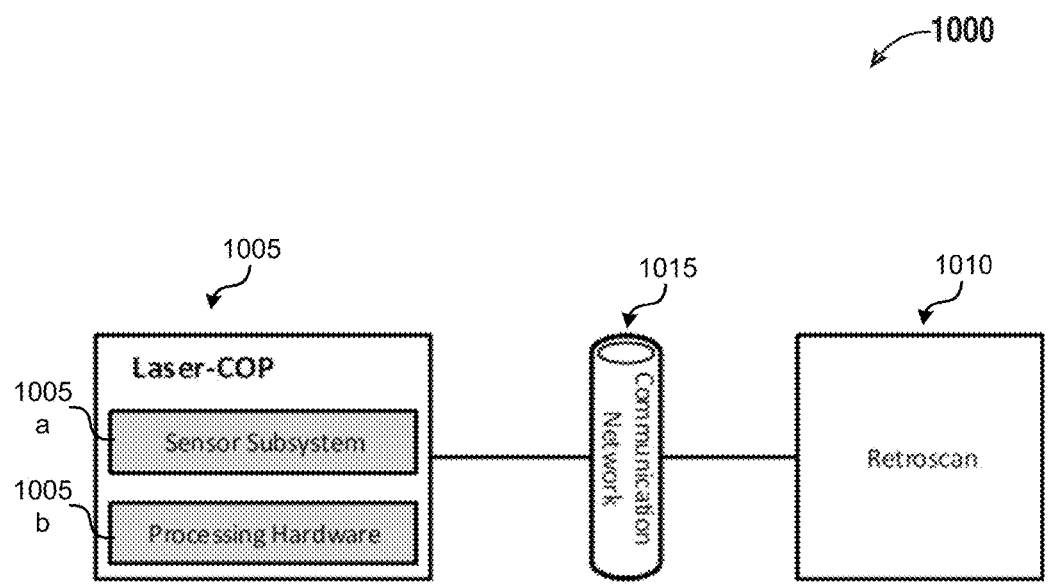
FIG. 10 illustrates a configuration for detecting a periscope according to one particular embodiment.

FIG. 10 illustrates an optical modular assembly 1000 configuration for detecting target objects according to one particular embodiment. Here, the optical modular assembly 1000 may be configured to detect hard body targets and periscopes using a laser 1005 and a retroscan 1110. By way of example only, the laser 1005 may be an eye-safe laser. The laser 1005 may scan the region around the area using time-gated, high speed detector arrays to detect laser pulse returns from hard body targets in the near field of view. By way of example, the laser 1005 may be able to scan over a complete 360 degrees, especially when the laser 1005 is stationary and configured to emit pulsed laser beams towards a rotating mirror of a scanning module (not shown here), as described in detail above with respect to at least FIGS. 1-3.

This then allows for a scan of the complete surroundings when attempting to detect for hard body surfaces and periscopes out at sea, otherwise known as the "complete operational picture." In some instances, the laser pulse may be fired every 100 ms (100 Hz). The collected scan data from the retrieved laser pulses may be collected from a sensor subsystem 1005a, which may include a sensor such as an APD-based camera. The sensor may capture data in a short window following each laser pulse, corresponding to the maximum light travel time to the target and back. The return signals may be measured in time increments of less than 50 ns, for a total time of approximately to 10 to 100 us for each laser pulse.

The collected scan data from the laser 1005 is passed to a processing hardware 1005b, where the scan data is processed to remove clutter and determine and identify the target objects. When a target object is detected, its absolute position is computed and stored in a database of the processing hardware 1005b or any other storage area that can store and retrieve data. A copy of this detected target information may then be transferred or passed to the retroscan 1010 to further determine if any of the detected targets are specifically periscopes. The transfer may be done by a communication network 1015. By way of example, such communication network 1015 may include an Ethernet connection.

Once the retroscan receives the data of the detected target information from the processing hardware 1005b, the retroscan 1010 is able to then identify periscopes by identifying several key signatures. For example, when the periscope is facing directly towards the optical modular assembly 1000, the retroscan 1010 can identify the periscope by utilizing the phenomenon of the retroreflection effect of periscopes for such target discrimination. This is because a periscope has an optical surface that reflects light with minimum of scattering, a characteristic that is unique and allow to determine whether or not the target object is a periscope. Thus, when the pulsed laser from the optical modular assembly 1000 strikes a persiscope facing towards the optical modular assembly 1000, retroreflection will cause the pulsed laser to strike the optical surface of a periscope and be redirected back to its original source with very little to no scattering. In some cases, the light reflected back from a retroreflector may have a beam divergence of 0.25° or less. In other cases, the light reflected back from a periscope may have a greater beam divergence. By way of example, the pulsed laser may be in the optional visible range, 523 nm, or in the near infrared range, 1.06 μm. In some instances, the optical modular assembly 1000 may even be upgraded to include a second laser, visible or near-infrared, in additional to the already included eye-safe laser. The two laser beams may then be made collinear by a dichroic beam splitter.

Accordingly, the retroreflected signal from non-periscope targets will be distinguishable from periscopes because such non-periscope targets typically exhibit Lambertian, near-Lambertian, or other divergent scattering. Accordingly, for voxels away from the clutter plane caused by sea level, signal strength may be used to discriminate between periscope targets and non-periscope targets. Any signals from non-periscope targets may be rejected. In some embodiments, the voxel readouts include measured signal strength. In other embodiments, the voxel readouts are binary, with a signal detected if measured signal strength is above a threshold. This threshold may be set to a value likely to exclude periscope targets and non-periscope targets.

When the periscope is facing away from the optical modular assembly, the retroscan 1010 may be able to still identify the presence of the periscope by using the back reflection signal from the periscope tube and the surrounding ocean.

Figure 11:
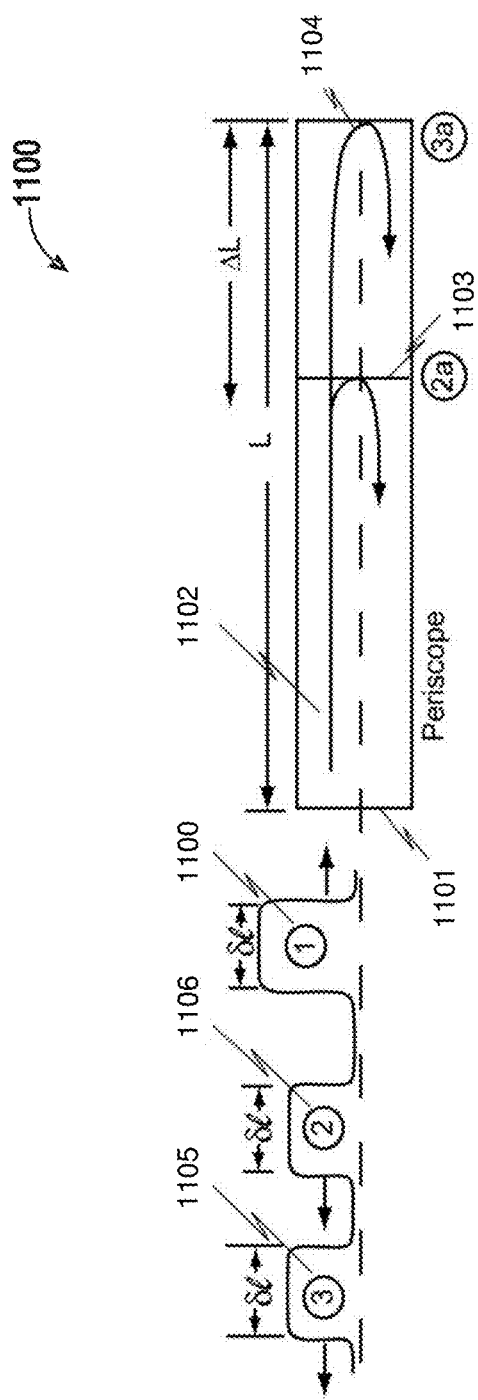
FIG. 11 illustrates a method of detecting a periscope using a multi-pulse method according to one particular embodiment.

Additionally, a multiple-pulse return timing may be utilized to distinguish clutter and the periscope targets. FIG. 11 illustrates this method. The multiple pulse return method is illustrated here as two return-pulses for simplicity. Assuming laser pulse temporal length, $\delta t$, and its spatial length, $\delta l$, we have:

$$\delta l = c \delta t \quad (1)$$

For example, for $\delta t = 10$ nsec, $\delta l = 3$ m, but for $\delta t = 1$ nsec, $\delta l = 30$ cm.

In FIG. 11, the incident laser pulse, 1100, is incident at the entrance/exit of perioscope, 1101, penetrating perioscope interior, 1102. Then, it is reflected from the 1st retro-surface (which is any focal plane), such as reticle (2a), 1103; then, passing $\Delta L$-distance (with L-periscope length), and reflecting from the 2nd retro-surface, such as eye piece, (3a), 1104. As a result, two return pulses, 1105 and 1106 occur. More than two retroreflective return pulses may occur, including pulses for all possible (relay) focal planes. Such surfaces do not need to have central reflection interface, since, vignetting retro-reflection may occur (reflections from boundaries is sufficient.) In order to obtain the pulse separation, the following condition has to be satisfied:

$$2\Delta L > c\delta t; \Delta L > \frac{c\delta t}{2} \quad (2)$$

For example, for $\delta t = 10$ nsec, Eq. (81) yields: $\Delta L > 1.5$ m; but, for $\delta t = 1$ nsec, $\Delta L > 15$ cm. Therefore by reducing laser pulse temporal length, $\delta t$, can increase the omnipulse resolution, since, for $\delta t = 1$ nsec, the separation between two retro-surfaces must be larger than only 15 cm. Eq. (2) can be generalized for a number of retro-surfaces larger than two; assuming condition (2) satisfied for any two sequent retro-surfaces.

The multiple-pulse return signature may typically be characterized by multiple return pulses from a single x,y location but with different return pulse times (and hence, different z locations in the voxel readout). In one embodiment, multiple-pulse return signatures may be determined for various different periscope types. These multiple-pulse return signatures may be detected in the voxel readouts and used for target identification. In another embodiment, any reading have the characteristics of multiple return pulses may be viewed and initially characterized as a potential target. Various other inferential rules, such as use of reference integrated clutter may then be applied to distinguish between a false positive and true positive.

Figure 12:
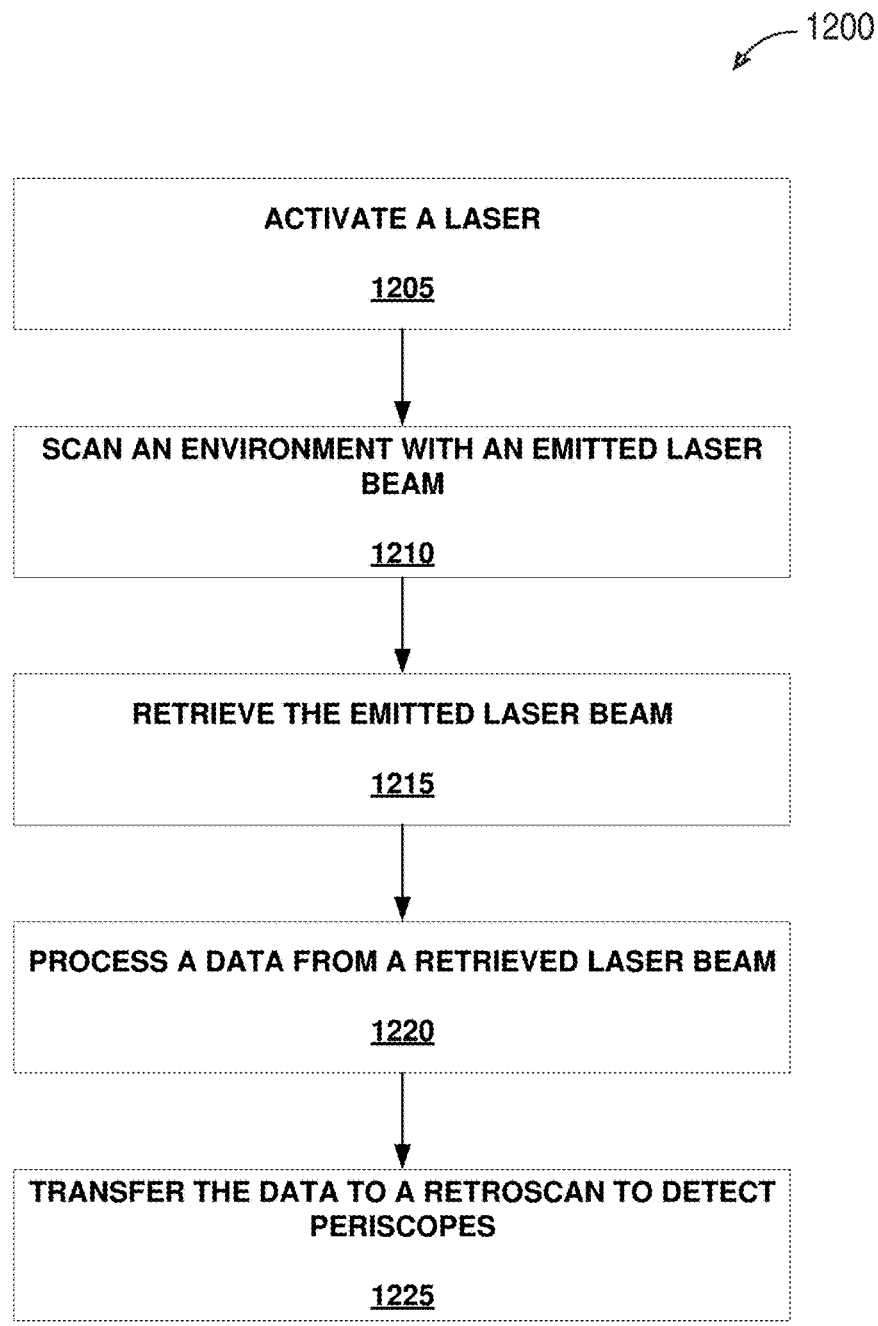
FIG. 12 is a flow chart for detecting a periscope using a laser beam according to one particular embodiment.

FIG. 12 is a flow chart for a method 1200 of detecting a periscope using a laser beam according to one particular embodiment. The method 1200 may include activating a laser housed within an optical platform assembly at step 1205. The optical platform assembly, as discussed above, may include an upper rotating assembly that includes a scan mirror and a lower non-rotating assembly that includes an eye-safe laser, telescope, sensor, and laser beam expander.

Next, at step 1210, the optical platform assembly may scan the environment by emitting the laser sourced from the lower non-rotating assembly to the scan mirror located at the upper rotating assembly, where the laser is then emitted out to the environment to obtain a complete view of the environment. In some instances, the upper rotating assembly rotates about the non-rotating assembly, thus allowing the laser to be emitted in all direction so that a 360 degree scan is possible. To achieve this 360 degree scan, a rotary connector may be attached between the upper rotating assembly and a lower non-rotating assembly to achieve this rotational motion of the upper rotating assembly.

Next, at step 1215, when the emitted laser beam hits a hard body object, the laser emitted laser beam reflects from the surface of the hard body object and is collinear with its emitted laser beam path as it returns to the upper-rotating assembly of the scan mirror.

The retrieved laser beam is then processed to identify what the hard body object is at step 1220. In some instances, the data from the retrieved laser beam is then sent to a retroscan at step 1225. The retroscan may then further analyze to data to detect for specific hard body objects, such as periscopes. Because periscopes have retroreflective properties, the retroscan takes advantage of this and is able to detect the presence of a periscope by identifying the retroreflection effect when an emitted laser beam hits an optical surface of a periscope. When the retrieved laser beam is processed in the optical platform assembly, the identification of retroreflection signals alert the high likelihood of a periscope as the target object. The data may further include orientation information so that positional information of the identified periscope may be calculated and determined. However, in the instance that the emitted laser beam does not hit the optical surface of a periscope, but rather the side or the tubing portion of the periscope, then the optical platform assembly cannot rely on the retroreflection effect as a signature to identify the presence of the periscope. In this particular instance, the optical platform assembly makes use of a backreflection signal from the periscope tube to determine the presence of a periscope. Furthermore, a multi-pulse return, such as a two-pulse return, may be further utilized to reduce false alarm signals.

Figure 13:
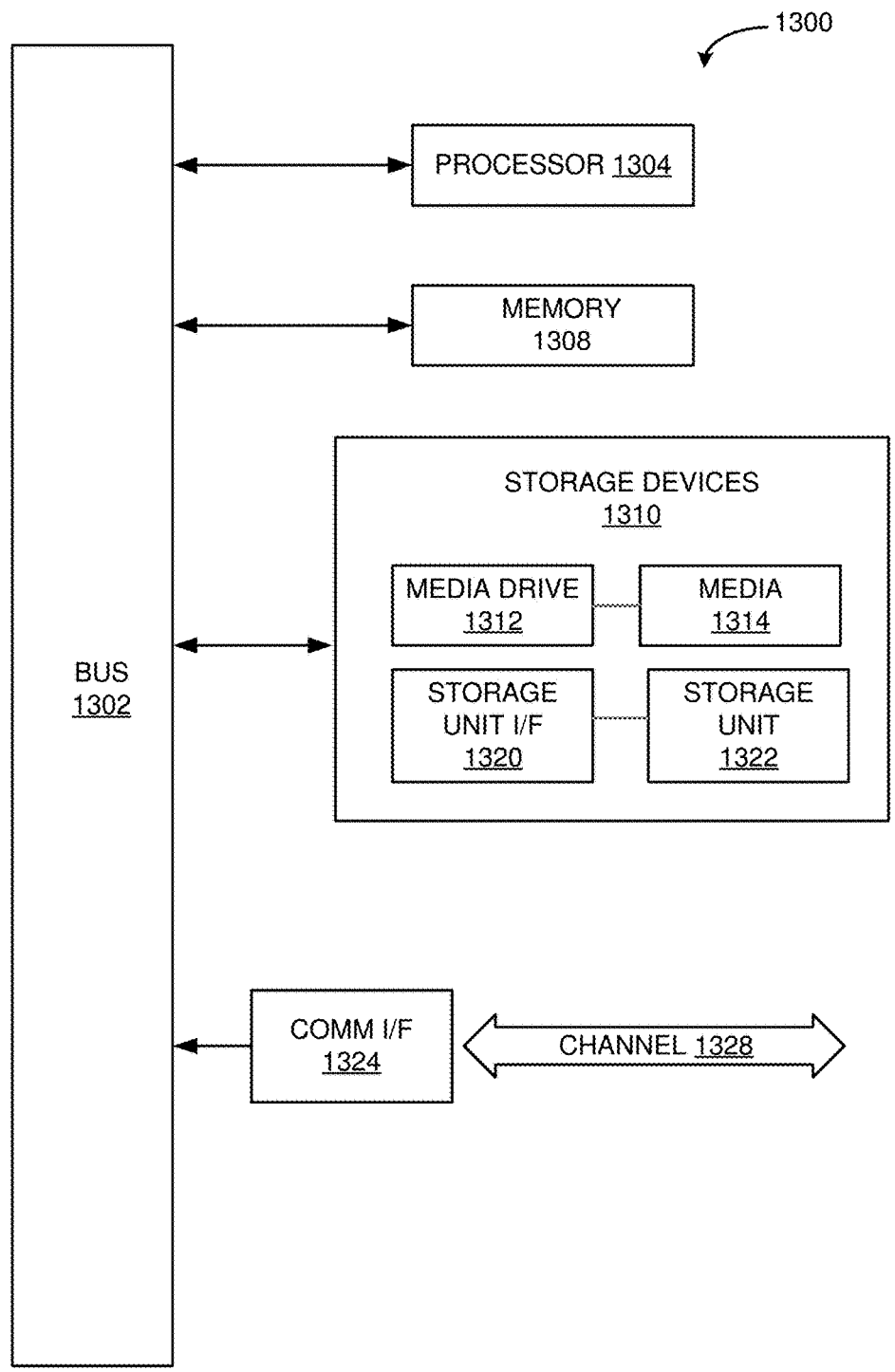
FIG. 13 illustrates an exemplary computer module that may be used when implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example-computing module 1300. After reading this description, it will become apparent to a person skilled in the relevant art how to implement the invention using other computing modules or architectures.

Referring now to FIG. 13, computing module 1300 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1300 might include, for example, one or more processors, controllers, control modules, or other processing devices, such as a processor 1304. Processor 1304 might be implemented using a general-purpose or special-purpose processing engine such as, for example, a microprocessor, controller, or other control logic. In the illustrated example, processor 1304 is connected to a bus 1302, although any communication medium can be used to facilitate interaction with other components of computing module 1300 or to communicate externally.

Computing module 1300 might also include one or more memory modules, simply referred to herein as main memory 1308. For example, preferably random access memory (RAM) or other dynamic memory, might be used for storing information and instructions to be executed by processor 1304. Main memory 1308 might also be used for storing temporary variables or other intermediate information during execution of instructions to be executed by processor 1304. Computing module 1300 might likewise include a read only memory ("ROM") or other static storage device coupled to bus 1302 for storing static information and instructions for processor 1304.

The computing module 1300 might also include one or more various forms of information storage mechanism 1310, which might include, for example, a media drive 1312 and a storage unit interface 1320. The media drive 1312 might include a drive or other mechanism to support fixed or removable storage media 1314. For example, a hard disk drive, a floppy disk drive, a magnetic tape drive, an optical disk drive, a CD or DVD drive (R or RW), or other removable or fixed media drive might be provided. Accordingly, storage media 1314 might include, for example, a hard disk, a floppy disk, magnetic tape, cartridge, optical disk, a CD or DVD, or other fixed or removable medium that is read by, written to or accessed by media drive 1312. As these examples illustrate, the storage media 1314 can include a computer usable storage medium having stored therein computer software or data.

In alternative embodiments, information storage mechanism 1310 might include other similar instrumentalities for allowing computer programs or other instructions or data to be loaded into computing module 1300. Such instrumentalities might include, for example, a fixed or removable storage unit 1322 and an interface 1320. Examples of such storage units 1322 and interfaces 1320 can include a program cartridge and cartridge interface, a removable memory (for example, a flash memory or other removable memory module) and memory slot, a PCMCIA slot and card, and other fixed or removable storage units 1322 and interfaces 1320 that allow software and data to be transferred from the storage unit 1322 to computing module 1300.

Computing module 1300 might also include a communications interface 1324. Communications interface 1324 might be used to allow software and data to be transferred between computing module 1300 and external devices. Examples of communications interface 1324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1324 might typically be carried on signals, which can be electronic, electromagnetic (which includes optical) or other signals capable of being exchanged by a given communications interface 1324. These signals might be provided to communications interface 1324 via a channel 1328. This channel 1328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1308, storage unit 1320, media 1314, and channel 1328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1300 to perform features or functions of the present invention as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An optical platform assembly comprising:
   a head comprising a scan mirror;
   a body comprising an optical module to detect a hard body object; and
   a rotary connector attaching the head to the body of the optical platform assembly;
   wherein the rotary connector comprises two or more individual rotary joints attached to a motor to provide an electrical path which allows the head to rotate up to 360 degrees about a vertical axis of the body to scan an environment for the hard body object by directing an emitted laser beam toward the mirror that is collinear with a returning laser beam, where the body is stationary and mounted to a surface.

2. The optical platform assembly of claim 1, wherein the body is a hollow cylinder that stores components of the optical module in a vertical position in close proximity.

3. The optical platform assembly of claim 2, wherein the optical module comprises a laser, telescope, and sensor.

4. The optical platform assembly of claim 3, wherein the laser comprises an eye-safe laser.

5. The optical platform assembly of claim 4, wherein the optical module further comprises a laser beam expander at a receiving end of the telescope.

6. The optical platform assembly of claim 1, wherein the individual rotary joints comprise an outer stator ring and an inner rotor ring with electrical conductive leads on both the outer stator ring and the inner rotor ring to provide electrical current flow to the individual rotary joints.

7. The optical platform assembly of claim 1, wherein the individual rotary joints are stacked such that each of the inner rotor rings of the individual rotary joints simultaneously rotate.

8. The optical platform assembly of claim 1, wherein the individual rotary joints comprise a bearing track placed in between the outer stator ring and the inner rotor ring, where the bearing track comprises a contact ring to provide electrical conductivity and continuity between the outer stator ring and the inner rotor ring.

9. The optical platform assembly of claim 8, wherein the bearing track further comprises a ball bearing to provide small spacing between each of the rotary joints that are stacked.

10. The optical platform assembly of claim 9, further comprises a seal ring placed in between the inner rotor ring and the outer stator ring.

11. A method for detecting a target object comprising:
   activating a laser housed within a lower non-rotating assembly of an optical platform assembly;
   scanning an environment by emitting the laser to a mirror housed within an upper rotating assembly to obtain a scan of the environment;
   retrieving an emitted laser beam that is reflected from the target object, where the emitted laser beam is collinear with a reflected laser beam;
   processing a data from the reflected laser beam to identify the target object; and transferring the data to a retroscan, where the retroscan detects for a specific target object from the data transferred.

12. The method of claim 11, wherein the lower non-rotating assembly comprises an eye-safe laser, telescope, sensor and a laser beam expander.

13. The method of claim 11, wherein the retroscan identifies the target object as a periscope when retroreflection signatures are detected from the reflected laser beam that strikes an optical surface of the periscope.

14. The method of claim 11, wherein the retroscan identifies the target object as a periscope by detecting backscatter signatures within the reflected laser beams when the emitted laser beam strikes a side of the periscope.

15. The method of claim 11, wherein scanning the environment comprises rotating the upper rotating assembly about the lower non-rotating assembly a complete 360 degrees.

16. The method of claim 15, wherein the optical platform assembly comprises a rotary connector positioned in between the lower non-rotating assembly and the upper rotating assembly to achieve rotation of the upper rotating assembly about a vertical axis of the optical platform assembly.

17. The method of claim 11, where the specific target object is a periscope.

18. The method of claim 16, wherein the rotary connector comprises two or more individual rotary joints attached to a motor to provide an electrical path to achieve the rotation of the upper rotating assembly about the vertical axis of the optical platform assembly.

* * * * *